(12) United States Patent
Zhang et al.

(10) Patent No.: US 12,524,895 B2
(45) Date of Patent: Jan. 13, 2026

(54) ENHANCED SLAM-BASED PARKING ASSIST WITH REUSABLE TRAINING OUTCOME FOR NEAR-IDENTICAL PARKING SLOTS

(71) Applicant: GM Global Technology Operations LLC, Detroit, MI (US)

(72) Inventors: Yuan Zhang, Shanghai (CN); Wenyuan Qi, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 18/521,099

(22) Filed: Nov. 28, 2023

(65) Prior Publication Data
US 2025/0157066 A1    May 15, 2025

(30) Foreign Application Priority Data
Nov. 13, 2023    (CN) .......................... 202311509763.4

(51) Int. Cl.
| | |
|---|---|
| G06V 20/58 | (2022.01) |
| B60W 30/06 | (2006.01) |
| B60W 50/14 | (2020.01) |
| B62D 15/02 | (2006.01) |
| G06T 7/579 | (2017.01) |

(52) U.S. Cl.
CPC ............. G06T 7/579 (2017.01); B60W 30/06 (2013.01); B60W 50/14 (2013.01); B62D 15/028 (2013.01); B62D 15/0285 (2013.01); G06V 20/586 (2022.01); *B60W 2050/146* (2013.01); *B60W 2420/403* (2013.01); *G06T 2207/20081* (2013.01); *G06T 2207/30264* (2013.01)

(58) Field of Classification Search
None
See application file for complete search history.

(56) References Cited

U.S. PATENT DOCUMENTS

| | | | | |
|---|---|---|---|---|
| 2021/0094536 A1* | 4/2021 | Suzuki | ................. | G05D 1/0212 |
| 2021/0380097 A1* | 12/2021 | Tokuhiro | ............ | B60W 50/082 |

FOREIGN PATENT DOCUMENTS

| | | | | |
|---|---|---|---|---|
| CN | 115223135 | * | 10/2022 | ............. G06T 7/246 |
| CN | 115635955 | * | 1/2023 | ............ B60W 30/06 |
| CN | 116494957 | * | 7/2023 | ............ B06W 30/06 |
| CN | 116533992 | * | 8/2023 | ............ B06W 30/06 |
| DE | 102016216157 A1 | | 3/2018 | |

(Continued)

*Primary Examiner* — Beniyam Menberu
(74) *Attorney, Agent, or Firm* — Vivacqua Crane, PLLC

(57) ABSTRACT

A method for SLAM-based parking assist includes determining that a host vehicle is entering a corridor adjacent a target parking slot and determining a potential reusability of at least one of a plurality of previously determined training outcome of a training process for the target parking slot. The training outcome includes training identifying data of a potential parking slot. The method further includes receiving identifying data of the target parking slot, identifying which of the plurality of training outcomes is reusable based on the identifying data of the target parking slot to select an identified training outcome, comparing the identifying data of the target parking slot with the identifying data of the potential parking slot of the identified training outcome, and loading the identifying data of the target parking slot into a SLAM-based parking assist.

17 Claims, 3 Drawing Sheets

(56) References Cited

FOREIGN PATENT DOCUMENTS

| DE | 112018001056 T5 | 11/2019 |
|----|-----------------|---------|
| DE | 102020214204 A1 | 5/2022  |
| DE | 102021107523 A1 | 9/2022  |

* cited by examiner

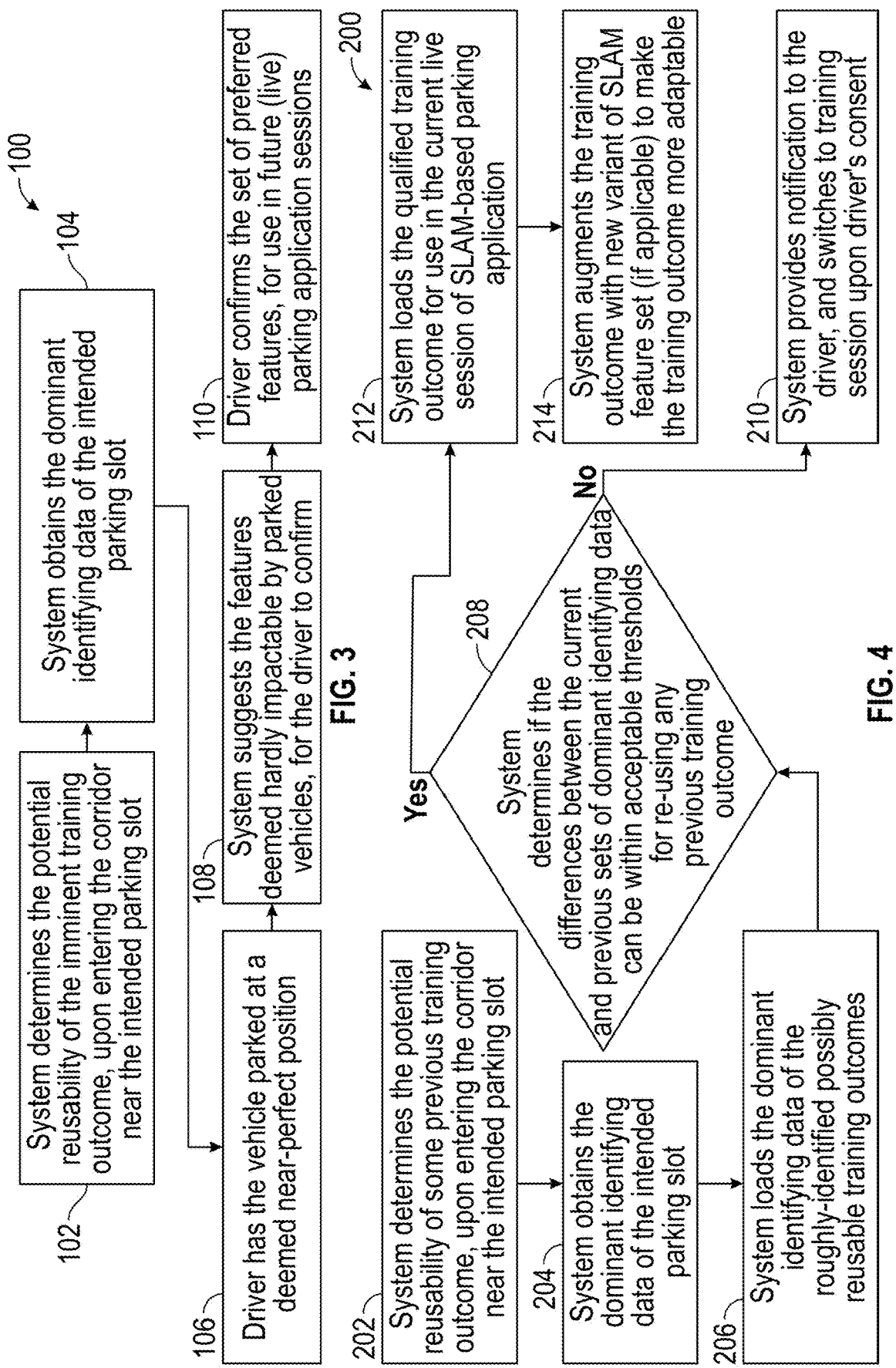

ENHANCED SLAM-BASED PARKING ASSIST WITH REUSABLE TRAINING OUTCOME FOR NEAR-IDENTICAL PARKING SLOTS

INTRODUCTION

The present disclosure relates to a system and method for enhanced Simultaneous localization and mapping (SLAM)-based parking assist using reusable training outcome for nearly identical parking slots.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

SLAM-based parking assist may be used to guide a vehicle into a parking slot, and such assist can be provided in the form of guidance information for the driver and/or enhancements for the automated parking functionality. However, in certain circumstances, a significant amount of training is required to guide the vehicle to the parking slot using SLAM-based park assist, regardless of the parking process being performed by the driver or the system. It is therefore desirable to minimize the training overhead of SLAM-based parking assist.

SUMMARY

The present disclosure describes a method for enhanced SLAM-based parking assist using reusable training outcome for nearly identical parking slots to minimize training overhead. The method includes determining that a host vehicle is entering a corridor adjacent to a target parking slot. The method also includes determining a potential reusability of a plurality of training outcomes of a training process for the target parking slot in response to determining that the host vehicle entered the corridor adjacent the target parking slot. Each of the plurality of training outcomes includes training identifying data of a potential parking slot. The method also includes receiving identifying data of the target parking slot in response to determining a potential reusability of the plurality of training outcomes of the training process for the target parking slot. The method also includes identifying which of the plurality of training outcomes is reusable based on the identifying data of the target parking slot to select an identified training outcome. The method also includes comparing the identifying data of the target parking slot with the identifying data of the potential parking slot of the identified training outcome to determine whether differences between the identifying data of the target parking slot and the identifying data of the potential parking slot of the identified training outcome are within predetermined thresholds. The method further includes loading the identifying data of the target parking slot into a SLAM-based park assist in response to determining that the differences between the identifying data of the target parking slot and the identifying data of the potential parking slot of the identified training outcome are within predetermined thresholds. The method described in this paragraph reuses the training out of previous training sessions to minimize the computational resources used by the SLAM-based parking assist instead of performing training sessions for each visited parking slot. Accordingly, the method described in this paragraph improves vehicle technology by minimizing the training overhead of SLAM-based parking assist of a vehicle by exploiting the reusability of the training outcomes of other parking facilities having nearly identical parking slots.

In some aspects of the present disclosure, the method further includes providing visual guidance to a vehicle occupant to complete parking using the SLAM-based park assist and the identifying data of the target parking slot. The method may include controlling the motion of the host vehicle to reach a target parking position in the target parking slot. The SLAM-based park assist employs a SLAM feature set to localize and map the host vehicle. The method may further include detecting a new variety of a SLAM feature dataset and adjusting the identified training outcome using the new variety of the SLAM feature dataset. The identifying data of the target parking slot includes geometrical attributes of the target parking slot, the identifying data of the potential parking slot of the identified training outcome includes geometrical attributes of the potential parking slot of the identified training outcome. The geometrical attributes of the target parking slot include a corridor width of the corridor adjacent the target parking slot, a chassis ramp height of a ramp interconnecting the corridor and the target parking slot, a slot internal width of the target parking slot, and a slot external width of the target parking slot. The method may further include determining that differences between the geometrical attributes of the target parking slot and the geometrical attributes of the potential parking slot of the identified training outcome are within predetermined geometrical thresholds.

The present disclosure further describes a system for enhanced SLAM-based parking assist using reusable training outcome for nearly identical parking slots. The system includes a plurality of sensors inside a vehicle. The system further includes a controller in communication with the sensors. The controller is programmed to execute the method described above.

The present disclosure also describes a tangible, non-transitory, machine-readable medium, comprising machine-readable instructions, that when executed by a processor, cause the processor to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein:

FIG. 3 is a flowchart of a method for training a system for enhanced SLAM-based parking assist using reusable training outcome for nearly identical parking slots.

FIG. 4 is a flowchart of a method for enhanced SLAM-based parking assist using reusable training outcome of a training session for nearly identical parking slots during a live session.

DETAILED DESCRIPTION

Figure 1:
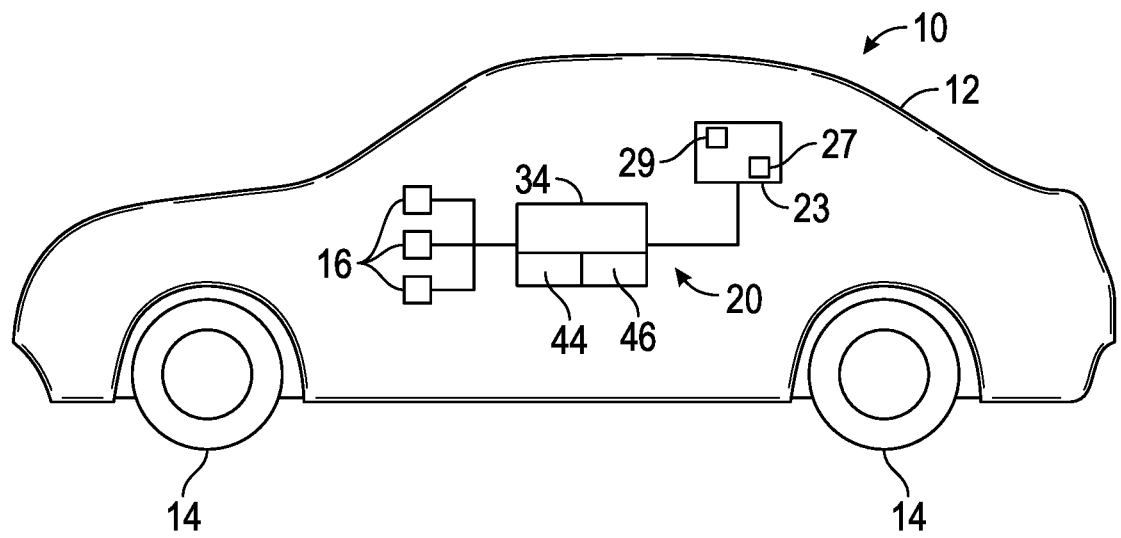
FIG. 1 is a schematic diagram of a vehicle including a system for enhanced SLAM-based parking assist using reusable training outcome for nearly identical parking slots.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a host vehicle 10 generally includes a body 12 and a plurality of wheels 14 coupled to the body 12. The host vehicle 10 may be an autonomous vehicle. In the depicted embodiment, the host vehicle 10 is depicted in the illustrated embodiment as a sedan, but it should be appreciated that other vehicles including trucks, coupes, sport utility vehicles (SUVs), recreational vehicles (RVs), etc., may also be used.

A system 20 may be part or work together with the host vehicle 10. The system 20 may be referred to as a system for enhanced SLAM-based parking assist using reusable training outcome for nearly identical parking slots and may include a controller 34. The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the vehicle controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a vehicle controller and may be programmed to execute methods 100, 200, and 300 (FIGS. 3-5) as described in detail below.

The instructions may include one or more separate programs, each of which comprises an ordered listing of executable instructions for implementing logical functions. The instructions, when executed by the processor 44, receive and process signals from sensors, perform logic, calculations, methods and/or algorithms for automatically controlling the components of the vehicle 10, and generate control signals to automatically control the components of the vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10.

The host vehicle 10 further includes one or more sensors 16 coupled to the vehicle body 12. The sensors 24 sense observable conditions of the exterior environment and/or the interior environment of the host vehicle 10. As non-limiting examples, the sensors 24 may include one or more cameras, one or more light detection and ranging (LIDAR) sensors, one or more proximity sensors, one or more cameras, one or more ultrasonic sensors, one or more thermal imaging sensors, and/or other sensors. Each sensor 24 is configured to generate a signal that is indicative of the sensed observable conditions (i.e., sensor data) of the exterior environment and/or the interior environment of the vehicle 10.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones (e.g., a microphone array) and/or other devices suitable to provide a notification to the vehicle user of the host vehicle 10. The user interface 23 is in electronic communication with the controller 34 and is configured to receive inputs by a vehicle occupant (e.g., a vehicle operator or a vehicle passenger). For example, the user interface 23 may include a touch screen and/or buttons configured to receive inputs from a person. Accordingly, the controller 34 is configured to receive inputs from the user via the user interface 23. The user interface 23 is also configured to output messages or notifications via the display 29 and/or speaker 27. For example, the user interface 23 may provide visual guidance to a vehicle occupant to complete parking using the SLAM-based parking assist and the identifying data of the target parking slot.

Figure 2:
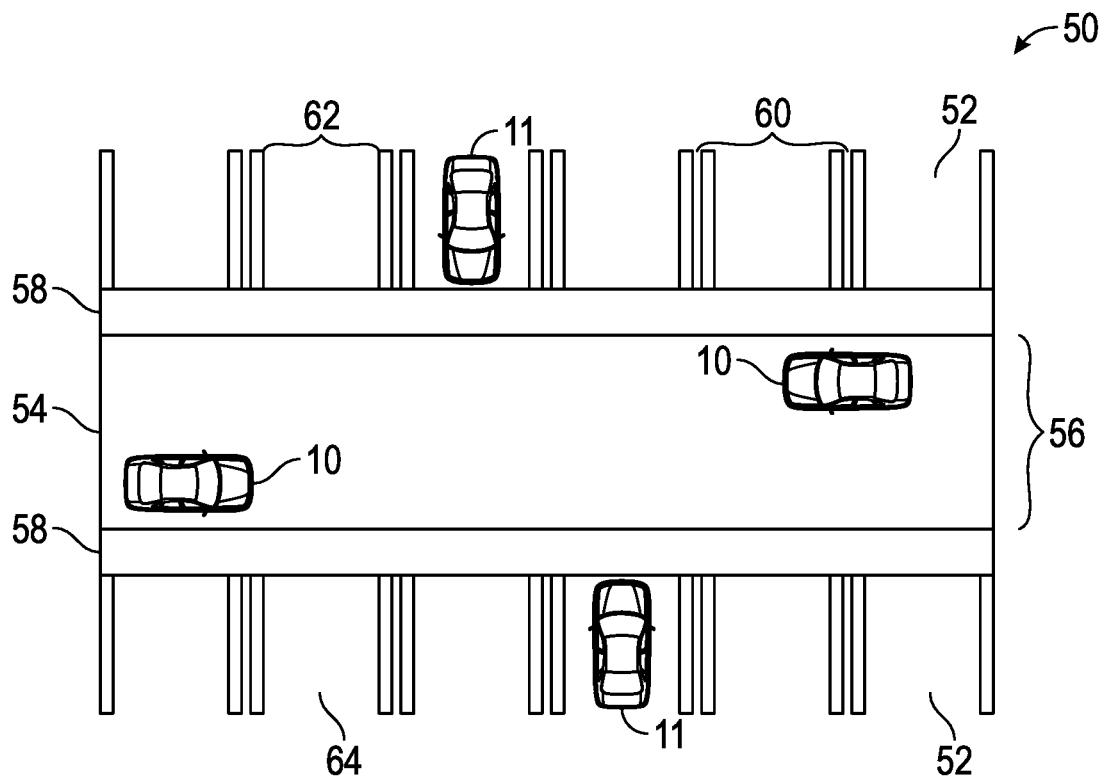
FIG. 2 is a schematic diagram of the vehicle of FIG. 1 inside a parking facility.

With reference to FIGS. 1 and 2, the vehicle 10 may include a system 20 for SLAM-based park assist. The system 20 may initiate when the host vehicle 10 enters a parking facility 50. The system 20 minimizes the training overhead of SLAM-based parking assist by exploiting the reusability of the training outcome of other parking facilities having nearly identical parking slots. The parking facility 50 has a plurality of parking slots 52 and a corridor 54 leading to one or more of the parking slots 52. A ramp 58 interconnects the corridor 54 to the parking slot chassis 64 of the parking slot 52. One of the parking slots 52 is considered the target parking slot. The "target parking slot" is the parking slot 52 in the parking facility 50 that the vehicle occupant of the host vehicle 10 selects to park. Accordingly, the target parking slot is adjacent to the corridor 54 of the parking facility 50.

The system 20 may be used in parking facilities with mechanical parking systems or other parking slots with hard perimeters. In the present disclosure, the term "mechanical parking system" means a type of parking system that uses mechanical devices to move and store cars in a limited space. Mechanical parking systems can be classified into two categories: semi-automated and fully-automated. Semi-automated parking systems require human intervention to drive or direct the cars into the machine, while fully-automated parking systems do not need any human assistance and can transport the cars from the entrance to the parking space by themselves. Mechanical parking systems are designed to save space, reduce emissions, increase security, and improve convenience for drivers. Some examples of mechanical parking systems are carousel parking system, puzzle parking systems, rack and rail parking systems and a tower parking system. A carousel parking system includes a circular structure that rotates cars vertically and horizontally. A puzzle parking system is a modular system that moves cars up, down, left, or right to create or access parking spaces. A rack and rail parking system is a fully automated system that uses a lift and a cart to transfer cars vertically and horizontally to their designated spaces. A tower parking system is a fully automated system that stacks cars vertically in a tower-like structure.

The system 20 uses a dataset of parking slots having hard perimeters as the typical use case. During operation, the system 20 obtains identifying data of the parking slots 52 in both the training and live sessions of the SLAM-based parking assist. Therefore, the system 20 obtains target identifying data of the target parking slot 52 in real-time. The identifying data of the target parking slot 52 may include geometrical attributes of the parking facility 50, such as the corridor width 56 of the corridor 54 adjacent the target parking slot 52, the chassis ramp height of the ramp 58 interconnecting the corridor 54 and the target parking slot, a slot internal width 62 of the target parking slot, and a slot external width 60 of the target parking slot 52. The reusability of the training outcome of the training session is determined based on the differences between the target identifying data of the target parking slot 52 in real-time and the training identifying data of a parking slot during a previous training session. To facilitate the reuse of the training identifying data, the training outcome is tailored with the SLAM feature points selected as pertaining to the parking slot perimeters that are hardly affected by the other parked vehicles 11. Thus, instead of performing training sessions for each visited parking slot 52, system 20 reuses the training outcomes of previous training sessions to minimize the computational resources used by the SLAM-based parking assist.

FIG. 3 is a flowchart of a method 100 for training a system for enhanced SLAM-based parking assist using reusable training outcome for nearly identical parking slots 52. The method 100 may be referred to as a training process and begins at block 102. At block 102, the controller 34 determines that the host vehicle 10 is entering the corridor 54 adjacent to a target parking slot 52 using the sensor data obtained from one or more sensors 16, such as the camera, and/or through crowdsourcing. Also, at block 102, the controller 34 determines a potential reusability of an imminent training outcome of the current training session when the host vehicle 10 enters the corridor 54 near the target parking slot 52. As a non-limiting example, the leading criteria for determining the potential reusability of the training outcome for SLAM-based parking assist is whether all the parking slots 52 in the parking facility 50 are nearly identical because the parking slots 52 are part of a mechanical parking system or otherwise have hard perimeters. Then, the method 100 continues to block 104.

At block 104, the controller 34 obtains the dominant identifying data of the target parking slot 52 using the sensors 16, such as a camera, and/or through crowdsourcing. The dominant identifying data of the target parking slot may be defined by the relevant geometrical attributes of the target parking slot 52. As non-limiting examples, the relevant geometrical attributes of the target parking slot 52 may include the corridor width 56 of the corridor 54 adjacent the target parking slot 52, the chassis ramp height of the ramp 58 interconnecting the corridor 54 and the target parking slot 52, the slot internal width 62 of the target parking slot 52, the slot external width 60 of the target parking slot 52, the offset position of the target parking slot 52 along the corridor direction between the nearest opposite parking slot 52 across the corridor 54. If a camera is used to obtain the dominant identifying data of the target parking slot 52, the camera frames set is selected to be the camera view frames with the appropriate spatial intervals when the host vehicle 10 is within a predetermined distance from the target parking slot 52 (e.g., less than 7.5 meters and greater than 3 meters). Next, the method 100 proceeds to block 106.

At block 106, the vehicle occupant parks the host vehicle 10 at what is deemed a nearly perfect parked position in the target parking slot 52. The nearly parked position may be a location where the host vehicle 10 is centered in the target parking slot 52. It is envisioned that the vehicle occupant may command the host vehicle 10 to autonomously park at what is deemed a nearly perfect parked position in the target parking slot 52. At this juncture, the camera (i.e., sensor 16) should capture images showing external features in the vicinity of the target parking slot 52 (e.g., other parked vehicles 11) for subsequent steps. Then, the method 100 continues to block 108.

At block 108, the controller 34 suggests which external features captured by the camera) are relevant to hard perimeters of the target parking slot 52 that are not affected by other parked vehicles 11. The controller 34 may rule out some non-qualifying features. Then, the method 100 continues to block 110. At block 110, the controller 34 commands the vehicle occupant to confirm through, for example, the user interface 23 the features set suggested by the controller 34 at block 108. The features suggested and confirmed by the vehicle occupant are then used in a live parking session.

FIG. 4 is a flowchart of a method 200 for enhanced SLAM-based parking assist using reusable training outcome for nearly identical parking slots 52 during a live session. The method 200 begins at block 202. At block 202, the controller 34 determines that the host vehicle 10 is entering the corridor 54 adjacent to a target parking slot 52 using the sensor data obtained from one or more sensors 16, such as the camera, and/or through crowdsourcing. Also, at block 202, the controller 34 determines a potential reusability of the training outcome of the previous training session when the host vehicle 10 enters the corridor 54 near the target parking slot 52. As a non-limiting example, the leading criteria for determining the potential reusability of the training outcome for SLAM-based parking assist is whether all the parking slots 52 in the parking facility 50 are nearly identical because the parking slots 52 are part of a mechanical parking system or otherwise have hard perimeters. Then, the method 200 continues to block 204.

At block 204, the controller 34 obtains the dominant identifying data of the target parking slot 52 using the sensors 16, such as the camera, and/or through crowdsourcing. The dominant identifying data of the target parking slot may be defined by the relevant geometrical attributes of the target parking slot 52. As non-limiting examples, the relevant geometrical attributes of the target parking slot 52 may include the corridor width 56 of the corridor 54 adjacent the target parking slot 52, the chassis ramp height of the ramp 58 interconnecting the corridor 54 and the target parking slot 52, the slot internal width 62 of the target parking slot 52, the slot external width 60 of the target parking slot 52, the offset position of the target parking slot 52 along the corridor direction between the nearest opposite parking slot 52 across the corridor 54. If a camera is used to obtain the dominant identifying data of the target parking slot 52, the camera frames set is selected to be the camera view frames with the appropriate spatial intervals when the host vehicle 10 is within a predetermined distance from the target parking slot 52 (e.g., less than 7.5 meters and greater than 3 meters). Next, the method 200 proceeds to block 206.

At block 206, the controller 34 identifies which of the plurality of training outcomes is reusable based on the identifying data of the target parking slot to select an identified training outcome. The controller 34 may identify the training outcome based on the geographical location of the target parking slot 52. Then, the controller 34 loads the dominant identifying data of the of the potential parking slot of the identified training outcome. Then, the method 200 proceeds to block 208.

At block 208, the controller 34 compares the identifying data of the target parking slot with the identifying data of the potential parking slot of the identified training outcome to determine whether differences between the identifying data of the target parking slot and the identifying data of the potential parking slot of the identified training outcome are within predetermined thresholds. If the differences between the identifying data of the target parking slot and the identifying data of the potential parking slot of the identified training outcome are not within predetermined thresholds, then the method 200 proceeds to block 210. If the differences between the identifying data of the target parking slot and the identifying data of the potential parking slot of the identified training outcome are within predetermined thresholds, then the method 200 proceeds to block 212. Block 208 is described in further detail below in the description related to FIG. 5.

At block 210, the controller 34 provides a notification to the vehicle occupant through, for example, the user interface 23. The notification indicates that no training outcome of a previous training session matches the current target parking slot 52. Further, the controller 34 commences a training session as described above with respect to the method 100 if the vehicle occupant authorizes such action.

At block 212, the controller 34 loads the identifying data of the target parking slot into the SLAM-based park assist. The controller 34 then commands the user interface 23 to provide visual guidance to the vehicle occupant to complete parking using the SLAM-based park assist and the identifying data of the target parking slot. Alternatively, if the host vehicle 10 is an autonomous vehicle, the controller 34 controls the motion of the host vehicle 10 to reach a target parking position in the target parking slot 52. Then, the method 200 continues to block 214.

At block 214, the controller 34 detects a new variety of the SLAM feature dataset if applicable. Next, the controller 34 adjusts the identified training outcome using the new variety of the SLAM feature dataset.

Figure 5:
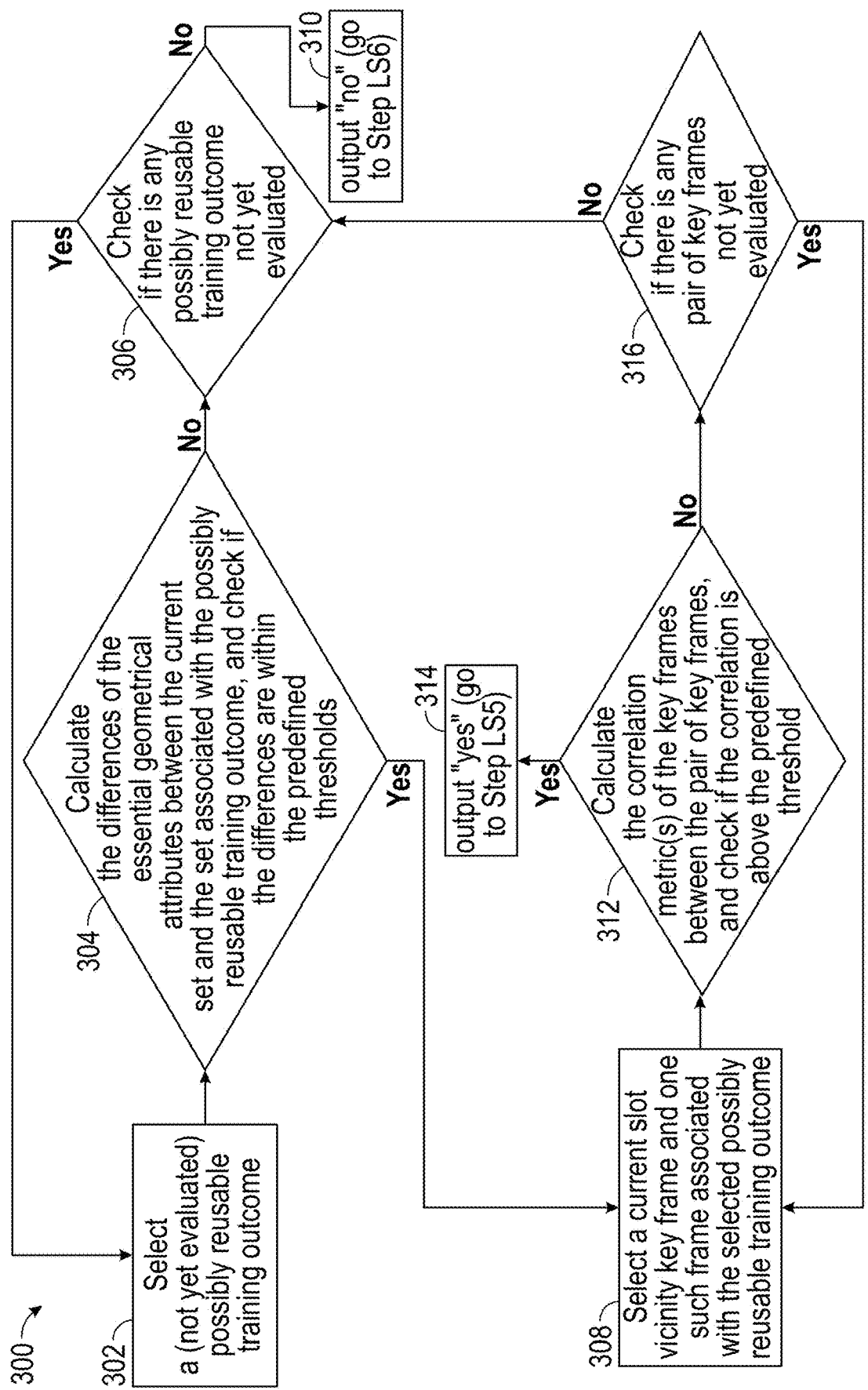
FIG. 5 is a flowchart of a method for determining whether a target parking slot is nearly identical to a potential parking slot of the training outcome of a training session.

FIG. 5 is a flowchart of a method 300 for determining whether the target parking slot 52 is nearly identical to a potential parking slot of the training outcome of a training session. This method 300 describes in detail block 208 of the method 200 and begins at block 302. At block 302, the controller 34 selects a possibly reusable training outcome of a training session (i.e., the identified training outcome). This possibly reusable training outcome has not been evaluated yet. Then, the method 300 continues to block 304.

At block 304, the controller 34 determines (e.g., calculates) the differences between the relevant geometrical attributes of the target parking slot 52 of the target parking slot 52 and the geometrical attributes of the potential parking slot of the identified training outcome of the training session to determine whether the differences are within predetermined geometrical thresholds. If the differences between the relevant geometrical attributes of the target parking slot 52 of the target parking slot 52 and the geometrical attributes of the potential parking slot of the identified training outcome are not within the predetermined geometrical thresholds, then the method 300 continues to block 306. If the differences between the relevant geometrical attributes of the target parking slot 52 of the target parking slot 52 and the geometrical attributes of the potential parking slot of the identified training outcome are within the predetermined geometrical thresholds, then the method 300 continues to block 308.

At block 306, the controller 34 checks whether there is any possibly training outcome not yet evaluated. If there are one or more training outcomes that have not yet been evaluated, then the method 300 returns to block 302. If all the training outcomes have been evaluated, then the method 300 continues to block 310. The controller 34 outputs a negative output (i.e., NO), and the method 200 above continues to block 210.

At block 308, the controller 34 selects the key video frames for the potential parking slot 52 associated with the selected possibly reusable training outcome. Then, the method 300 continues to block 310. At block 312, the controller 34 determines (e.g., calculates) the correlation metric(s) of the key video frames between the key video frames captured in real time with the key video frames of the training outcome of the training session to determine whether the image correlation is within predetermined thresholds. The image correlation metric(s) may be, for example, phase correlation, high-frequency components, hue and saturation spectrum correlation, and some combination of multiple correlation values, among others, as properly designed to fit the relevant scenarios. If the image correlation metrics are within the predetermined thresholds, then the method 300 proceeds to block 314. At block 314, the controller 34 outputs a positive output (i.e., Yes) and the method 200 above proceeds to block 212. If the image correlation metrics are not within the predetermined thresholds, then the method 300 proceeds to block 316.

At block 316, the controller 34 determines if there are any pair of key video frames (i.e., the real-time video frames and the key frames of the training outcome during the training session) have not been evaluated. If there are some pairs of key video frames that have not been evaluated, then the method 300 returns to block 308. If all the pairs of key video frames that have been evaluated, then the method 300 returns to block 306.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein.

Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for SLAM-based parking assist, comprising:
   determining that a host vehicle is entering a corridor adjacent a target parking slot;
   in response to determining that the host vehicle entered the corridor adjacent the target parking slot, determining a potential reusability of a plurality of training outcomes of a training process for the target parking slot, wherein each of the plurality of training outcomes includes training identifying data of a potential parking slot;
   in response to determining a potential reusability of the plurality of training outcomes of the training process for the target parking slot, receiving identifying data of the target parking slot;
   identifying which of the plurality of training outcomes is reusable based on the identifying data of the target parking slot to select an identified training outcome;
   comparing the identifying data of the target parking slot with the identifying data of the potential parking slot of the identified training outcome to determine whether differences between the identifying data of the target parking slot and the identifying data of the potential parking slot of the identified training outcome are within predetermined thresholds; and
   in response to determining that the differences between the identifying data of the target parking slot and the identifying data of the potential parking slot of the identified training outcome are within predetermined thresholds, loading the identifying data of the target parking slot into a SLAM-based parking assist,
   wherein the SLAM-based parking assist employs a SLAM feature set to localize and map the host vehicle, and the method further comprising:
      detecting a new variety of a SLAM feature dataset; and
      adjusting the identified training outcome using the new variety of the SLAM feature dataset.

2. The method of claim 1, further comprising providing visual guidance to a vehicle occupant to complete parking using the SLAM-based parking assist and the identifying data of the target parking slot.

3. The method of claim 1, further comprising controlling a motion of the host vehicle to reach a target parking position in the target parking slot.

4. The method of claim 1, wherein the identifying data of the target parking slot includes geometrical attributes of the target parking slot, the identifying data of the potential parking slot of the identified training outcome includes geometrical attributes of the potential parking slot of the identified training outcome.

5. The method of claim 4, wherein the geometrical attributes of the target parking slot include a corridor width of the corridor adjacent the target parking slot, a chassis ramp height of a ramp interconnecting the corridor and the target parking slot, a slot internal width of the target parking slot, and a slot external width of the target parking slot.

6. The method of claim 4, further comprising determining that differences between the geometrical attributes of the target parking slot and the geometrical attributes of the potential parking slot of the identified training outcome are within predetermined geometrical thresholds.

7. A system for SLAM-based parking assist, comprising:
   a plurality of sensors;
   a controller in communication with the plurality of sensors, wherein the controller is programmed to:
      determine that a host vehicle is entering a corridor adjacent a target parking slot;

in response to determining that the host vehicle entered the corridor adjacent the target parking slot, determine a potential reusability of a plurality of training outcomes of a training process for the target parking slot, wherein each of the plurality training outcomes includes training identifying data of a potential parking slot;

in response to determining a potential reusability of the plurality training outcomes of the training process for the target parking slot, receive identifying data of the target parking slot;

identify which of the plurality of training outcomes is reusable based on the identifying data of the target parking slot to select an identified training outcome;

compare the identifying data of the target parking slot with the identifying data of the potential parking slot of the identified training outcome to determine whether differences between the identifying data of the target parking slot and the identifying data of the potential parking slot of the identified training outcome are within predetermined thresholds; and in response to determining that the differences between the identifying data of the target parking slot and the identifying data of the potential parking slot of the identified training outcome are within predetermined thresholds, load the identifying data of the target parking slot into a SLAM-based parking assist, wherein the SLAM-based parking assist employs a SLAM feature set to localize and map the host vehicle, and wherein the controller is programmed to:

detect a new variety of a SLAM feature dataset; and adjust the identified training outcome using the new variety of the SLAM feature dataset.

8. The system of claim 7, wherein the controller is programmed to command a user interface to provide visual guidance to a vehicle occupant to complete parking using the SLAM-based parking assist and the identifying data of the target parking slot.

9. The system of claim 7, wherein the controller is programmed to control a motion of the host vehicle to reach a target parking position in the target parking slot.

10. The system of claim 7, wherein the identifying data of the target parking slot includes geometrical attributes of the target parking slot, the identifying data of the potential parking slot of the identified training outcome includes geometrical attributes of the potential parking slot of the identified training outcome.

11. The system of claim 10, wherein the geometrical attributes of the target parking slot include a corridor width of the corridor adjacent the target parking slot, a chassis ramp height of a ramp interconnecting the corridor and the target parking slot, a slot internal width of the target parking slot, and a slot external width of the target parking slot.

12. The system of claim 11, wherein the controller is programmed to determine that differences between the geometrical attributes of the target parking slot and the geometrical attributes of the potential parking slot of the identified training outcome are within predetermined geometrical thresholds.

13. A tangible, non-transitory, machine-readable medium, comprising machine-readable instructions, that when executed by a processor, cause the processor to:

determine that a host vehicle is entering a corridor adjacent a target parking slot;

in response to determining that the host vehicle entered the corridor adjacent the target parking slot, determine a potential reusability of a plurality of training outcomes of a training process for the target parking slot, wherein each of the plurality of training outcomes includes training identifying data of a potential parking slot;

in response to determining a potential reusability of the plurality of training outcomes of the training process for the target parking slot, receive identifying data of the target parking slot;

identify which of the plurality of training outcomes is reusable based on the identifying data of the target parking slot to select an identified training outcome;

compare the identifying data of the target parking slot with the identifying data of the potential parking slot of the identified training outcome to determine whether differences between the identifying data of the target parking slot and the identifying data of the potential parking slot of the identified training outcome are within predetermined thresholds; and in response to determining that the differences between the identifying data of the target parking slot and the identifying data of the potential parking slot of the identified training outcome are within predetermined thresholds, load the identifying data of the target parking slot into a SLAM-based park assist, wherein the SLAM-based park assist employs a SLAM feature set to localize and map the host vehicle, and the tangible, non-transitory, machine-readable medium further comprising machine-readable instructions, that when executed by the processor, causes the processor to:

detect a new variety of a SLAM feature dataset; and adjust the identified training outcome using the new variety of the SLAM feature dataset.

14. The tangible, non-transitory, machine-readable medium of claim 13, wherein the tangible, non-transitory, machine-readable medium further comprising machine-readable instructions, that when executed by the processor, causes the processor to command a user interface to provide visual guidance to a vehicle occupant to complete parking using the SLAM-based parking assist and the identifying data of the target parking slot.

15. The tangible, non-transitory, machine-readable medium of claim 13, wherein the tangible, non-transitory, machine-readable medium further comprising machine-readable instructions, that when executed by the processor, causes the processor to control a motion of the host vehicle to reach a target parking position in the target parking slot.

16. The tangible, non-transitory, machine-readable medium of claim 13, wherein the identifying data of the target parking slot includes geometrical attributes of the target parking slot, the identifying data of the potential parking slot of the identified training outcome includes geometrical attributes of the potential parking slot of the identified training outcome.

17. The tangible, non-transitory, machine-readable medium of claim 16, wherein the tangible, non-transitory, machine-readable medium further comprising machine-readable instructions, that when executed by the processor, causes the processor to determine that differences between the geometrical attributes of the target parking slot and the geometrical attributes of the potential parking slot of the identified training outcome are within predetermined geometrical thresholds.

* * * * *